(12) United States Patent
Vassilovski et al.

(10) Patent No.: US 11,671,315 B2
(45) Date of Patent: Jun. 6, 2023

(54) INTER-VEHICLE WIRELESS IN-VEHICLE NETWORK INTERFERENCE MANAGEMENT

(71) Applicant: QUALCOMM Incorporated, San Diego, CA (US)

(72) Inventors: Dan Vassilovski, Del Mar, CA (US); Hong Cheng, Basking Ridge, NJ (US); Shailesh Patil, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/167,852

(22) Filed: Feb. 4, 2021

(65) Prior Publication Data

US 2021/0250231 A1 Aug. 12, 2021

Related U.S. Application Data

(60) Provisional application No. 62/971,663, filed on Feb. 7, 2020.

(51) Int. Cl.
*H04L 41/0806* (2022.01)
*H04W 8/24* (2009.01)
*H04W 4/48* (2018.01)

(52) U.S. Cl.
CPC ........... *H04L 41/0806* (2013.01); *H04W 4/48* (2018.02); *H04W 8/24* (2013.01)

(58) Field of Classification Search
CPC ........... H04W 8/22; H04W 8/24; H04W 4/40; H04W 4/48; H04W 72/0406; H04W 76/00; H04W 76/10; H04L 2012/40273; H04L 67/12; H04L 2209/84; H04L 4/20; H04L 2012/6486; H04L 2027/0083; H04L 69/04
See application file for complete search history.

(56) References Cited

U.S. PATENT DOCUMENTS

| 11,159,925 | B2* | 10/2021 | Kim ........................ H04W 4/06 |
| 2008/0055068 | A1* | 3/2008 | Van Wageningen ........................ H04W 52/46 340/539.3 |
| 2018/0007076 | A1* | 1/2018 | Galula .................... H04L 69/40 |
| 2018/0253976 | A1* | 9/2018 | Inam ........................ G08G 1/22 |

(Continued)

FOREIGN PATENT DOCUMENTS

JP 2018101384 A 6/2018

OTHER PUBLICATIONS

International Search Report and Written Opinion—PCT/US2021/016898—ISA/EPO—dated May 18, 2021.

*Primary Examiner* — Warner Wong
(74) *Attorney, Agent, or Firm* — Harrity & Harrity LLP/Qualcomm Incorporated

(57) ABSTRACT

Various aspects of the present disclosure generally relate to wireless communications. In some aspects, a user equipment (UE) may transmit a wireless in-vehicle network (wIVN) capability indication that indicates that the UE is associated with a vehicle that includes a wIVN; receive a response to the wIVN capability indication from another UE; and provide configuration information to a wIVN control unit of the vehicle associated with configuring the wIVN based at least in part on the response. Numerous other aspects are provided.

30 Claims, 9 Drawing Sheets

(56) References Cited

U.S. PATENT DOCUMENTS

| | | | |
|---|---|---|---|
| 2018/0278385 A1* | 9/2018 | Wu | H04W 16/10 |
| 2019/0007795 A1* | 1/2019 | Kim | H04L 67/12 |
| 2019/0045454 A1 | 2/2019 | Haran et al. | |
| 2019/0220037 A1* | 7/2019 | Vladimerou | G05D 1/0088 |
| 2019/0239118 A1* | 8/2019 | Baghel | H04L 5/0053 |
| 2019/0318631 A1* | 10/2019 | Seaman | G06Q 20/3229 |
| 2020/0111346 A1* | 4/2020 | Kodama | G07C 5/008 |
| 2020/0170059 A1* | 5/2020 | Belleschi | H04W 72/1205 |
| 2020/0329352 A1* | 10/2020 | Wang | H04L 67/303 |
| 2021/0314750 A1* | 10/2021 | Nguyen | H04W 72/1242 |
| 2022/0158757 A1* | 5/2022 | Shimozawa | H04L 1/0047 |

* cited by examiner

INTER-VEHICLE WIRELESS IN-VEHICLE NETWORK INTERFERENCE MANAGEMENT

CROSS-REFERENCE TO RELATED APPLICATION

This Patent Application claims priority to U.S. Provisional Patent Application No. 62/971,663, filed on Feb. 7, 2020, entitled "INTER-VEHICLE WIRELESS IN-VEHICLE NETWORK INTERFERENCE MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for inter-vehicle wireless in-vehicle network interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a wireless in-vehicle network (wIVN) capability indication that indicates that the UE is associated with a vehicle that includes a wIVN; receiving a response to the wIVN capability indication from another UE; and providing configuration information to a wIVN control unit of the vehicle associated with configuring the wIVN based at least in part on the response.

In some aspects, a method of wireless communication, performed by a UE, may include receiving a wIVN capability indication that indicates that another UE is associated with a vehicle that includes a wIVN; and transmitting a response to the wIVN capability indication to the other UE.

In some aspects, a UE for wireless communication may include memory and one or more processors operatively coupled to the memory. The memory and the one or more processors may be configured to transmit a wIVN capability indication that indicates that the UE is associated with a vehicle that includes a wIVN; receive a response to the wIVN capability indication from another UE; and provide configuration information to a wIVN control unit of the vehicle associated with configuring the wIVN based at least in part on the response.

In some aspects, a UE for wireless communication may include memory and one or more processors operatively coupled to the memory. The memory and the one or more processors may be configured to receive a wIVN capability indication that indicates that another UE is associated with a vehicle that includes a wIVN; and transmit a response to the wIVN capability indication to the other UE.

In some aspects, a non-transitory computer-readable medium may store one or more instructions for wireless communication. The one or more instructions, when executed by one or more processors of a UE, may cause the one or more processors to: transmit a wIVN capability indication that indicates that the UE is associated with a vehicle that includes a wIVN; receive a response to the wIVN capability indication from another UE; and provide configuration information to a wIVN control unit of the vehicle associated with configuring the wIVN based at least in part on the response.

In some aspects, a non-transitory computer-readable medium may store one or more instructions for wireless communication. The one or more instructions, when executed by one or more processors of a UE, may cause the one or more processors to: receive a wIVN capability indication that indicates that another UE is associated with a vehicle that includes a wIVN; and transmit a response to the wIVN capability indication to the other UE.

In some aspects, an apparatus for wireless communication may include means for transmitting a wIVN capability indication that indicates that the apparatus is associated with a vehicle that includes a wIVN; means for receiving a response to the wIVN capability indication from another apparatus; and means for providing configuration information to a wIVN control unit of the vehicle associated with configuring the wIVN based at least in part on the response.

In some aspects, an apparatus for wireless communication may include means for receiving a wIVN capability indication that indicates that another apparatus is associated with a vehicle that includes a wIVN; and means for transmitting a response to the wIVN capability indication to the other apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
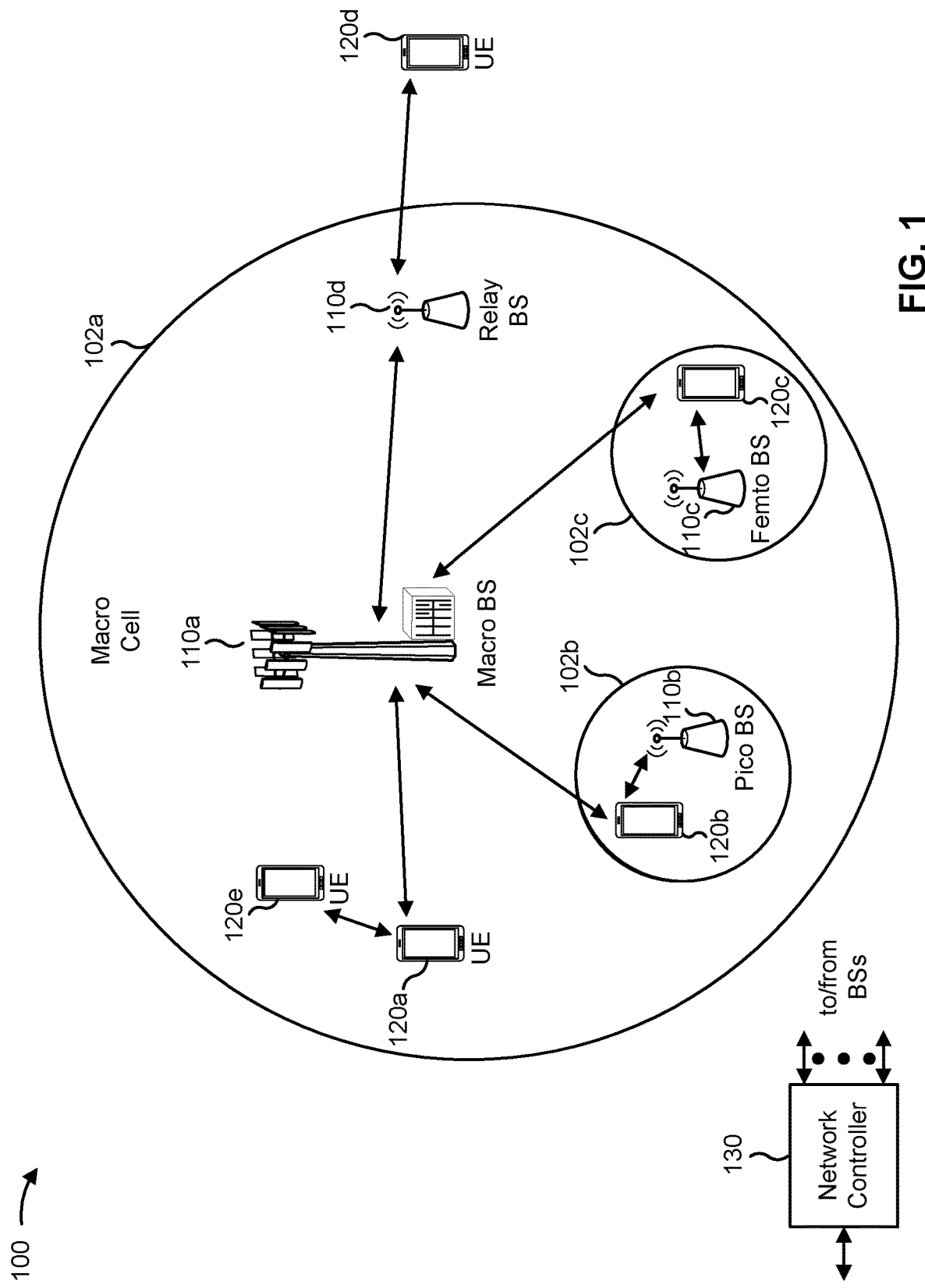
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
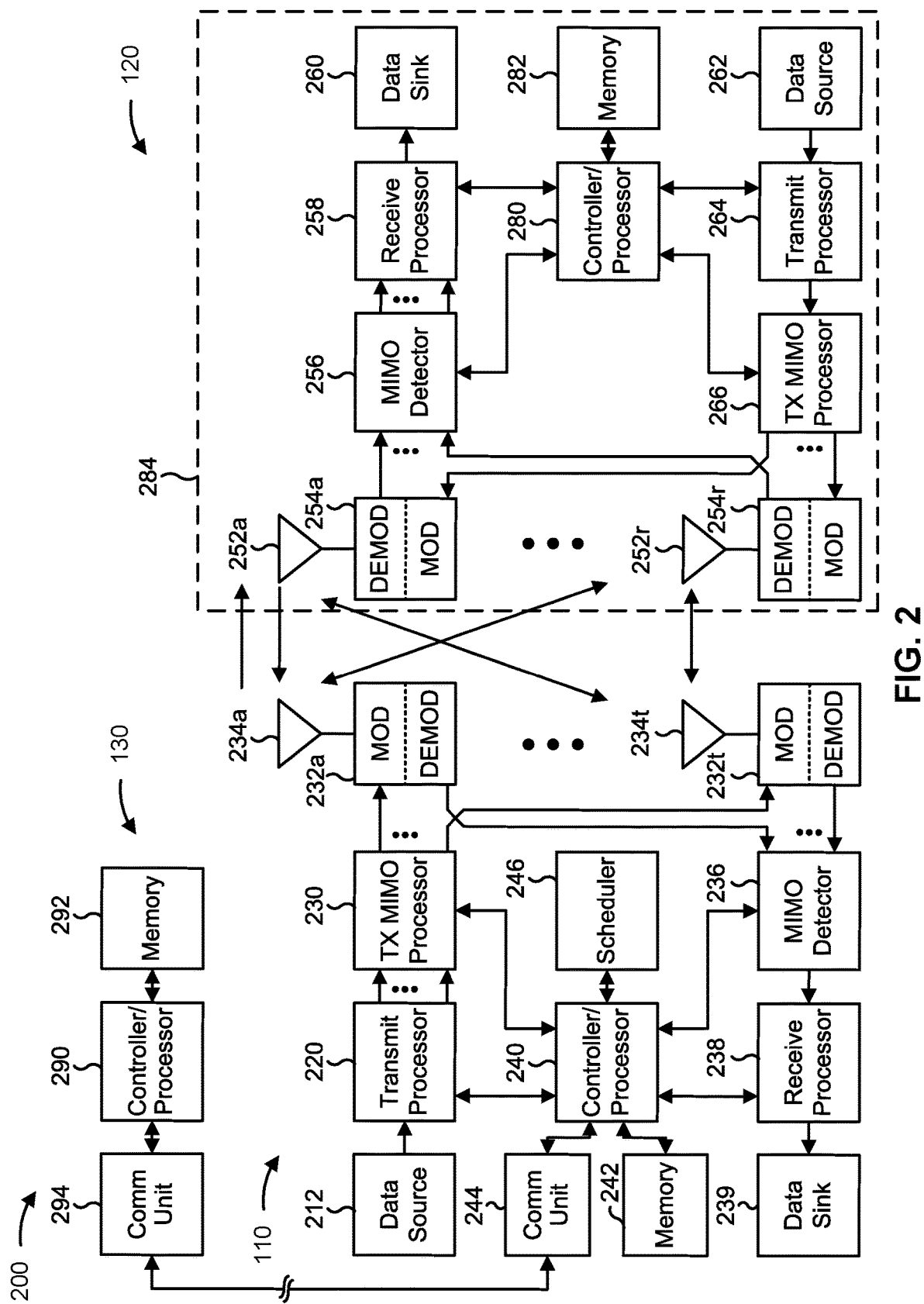
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with inter-vehicle wireless in-vehicle network interference management, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for transmitting a wireless in-vehicle network (wIVN) capability indication that indicates that the UE is associated with a vehicle that includes a wIVN, means for receiving a response to the wIVN capability indication from another UE, means for providing configuration information to a wIVN control unit of the vehicle associated with configuring the wIVN based at least in part on the response, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving a wireless in-vehicle network (wIVN) capability indication that indicates that another UE is associated with a vehicle that includes a wIVN, means for transmitting a response to the wIVN capability indication to the other UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
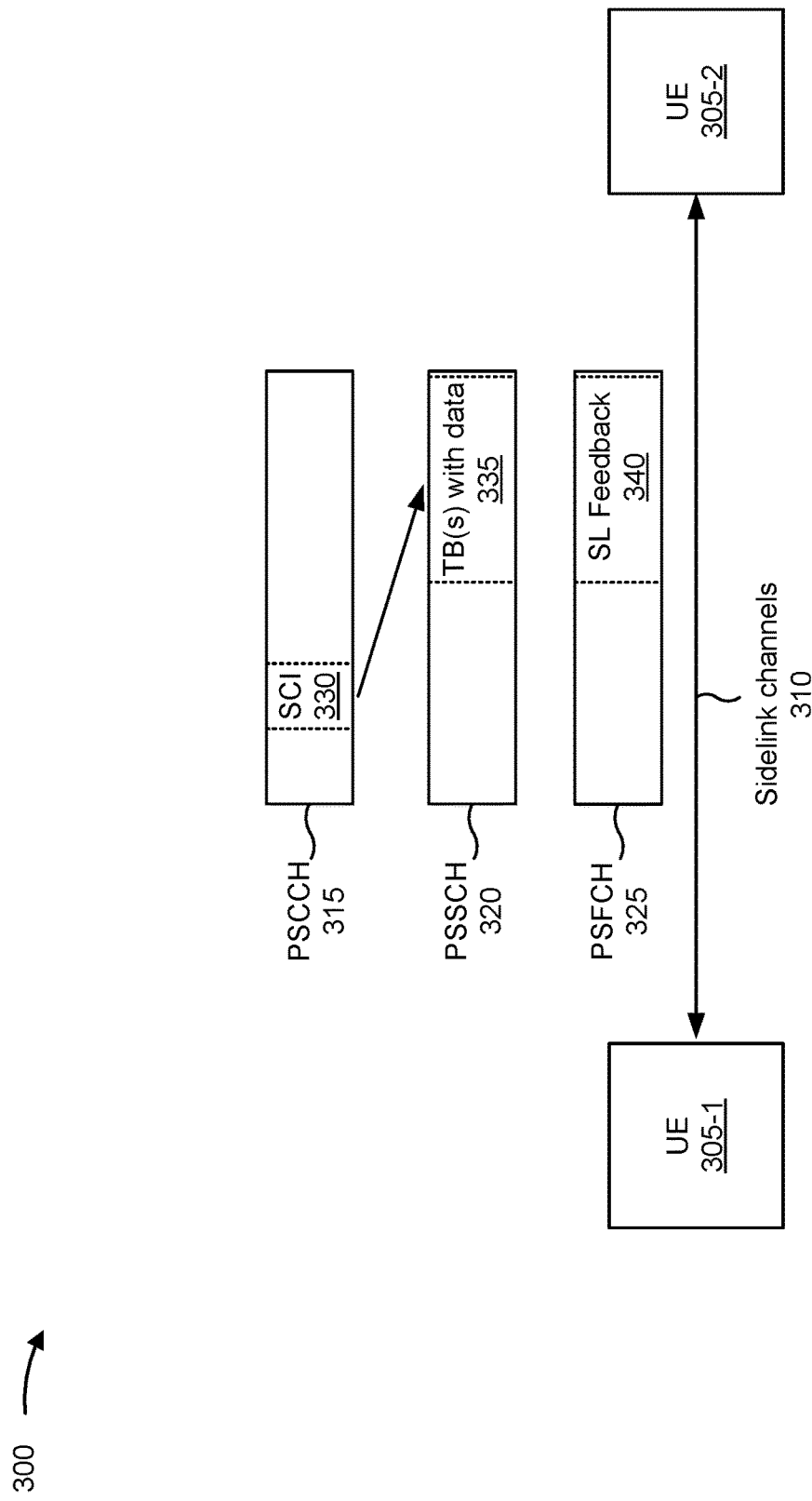
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, spatial resources, and/or the like) like a transport block (TB) 335 that may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
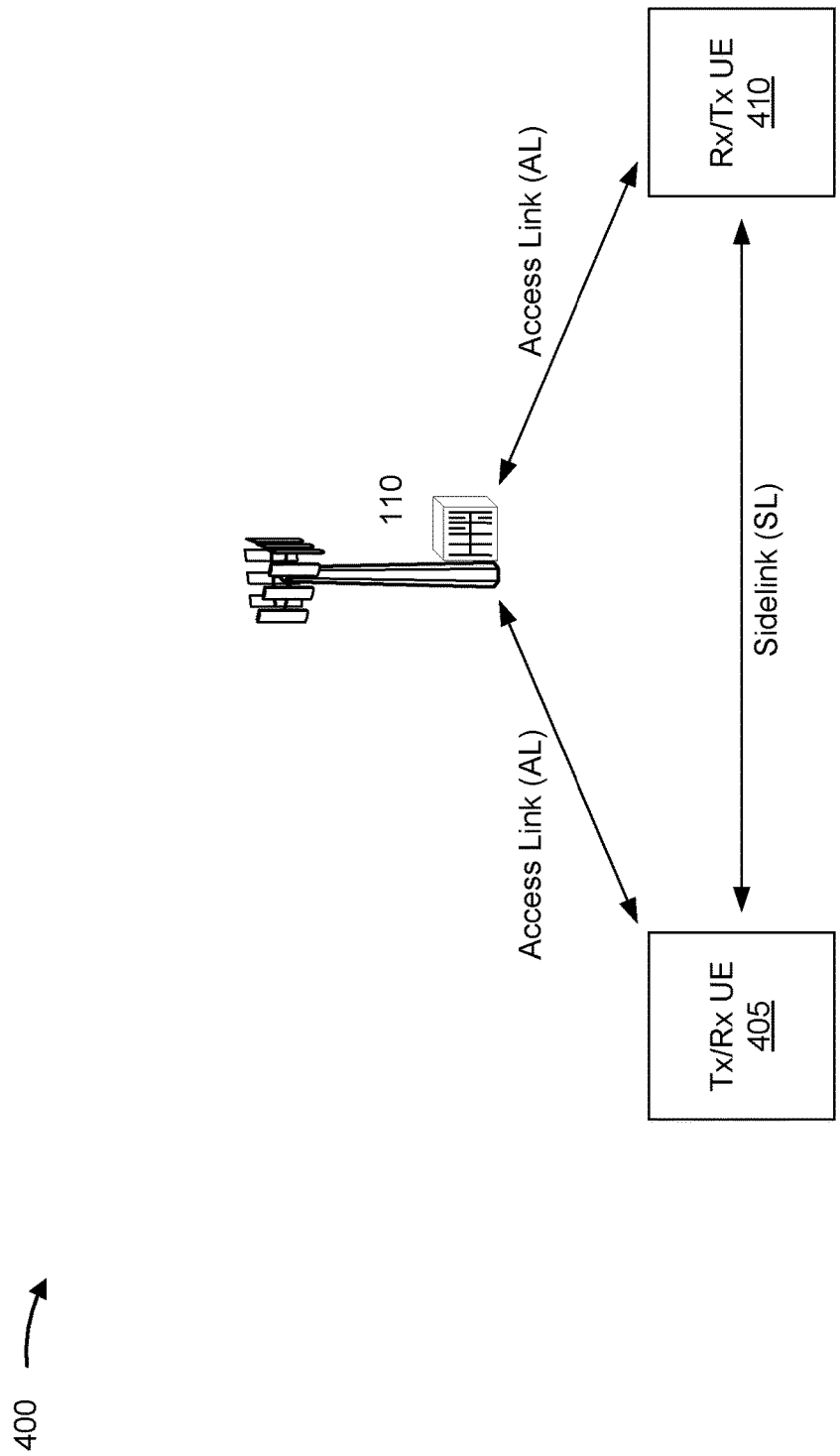
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
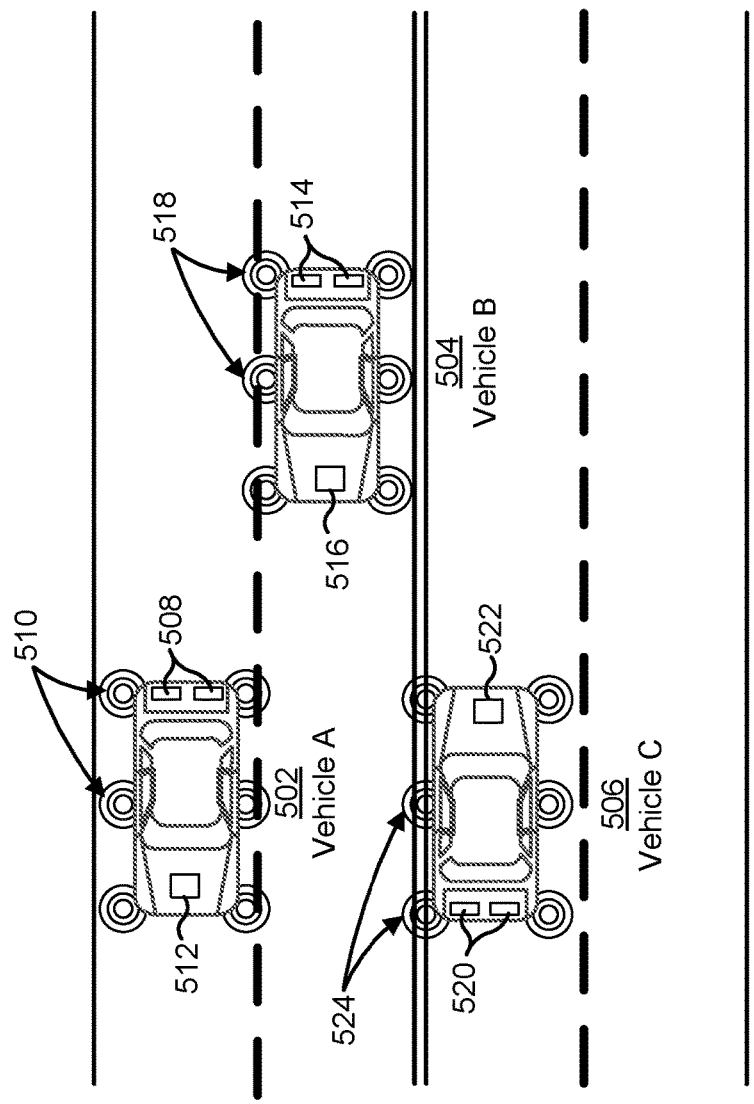
FIG. 5 is a diagram illustrating an example of inter-vehicle wireless in-vehicle network interference, in accordance with the present disclosure.

FIG. 5 is a diagram illustrating an example 500 of inter-vehicle wireless in-vehicle network interference, in accordance with the present disclosure. As shown in FIG. 5, a number of vehicles (shown as "vehicle A 502," "vehicle B 504," and "vehicle C 506") may travel in proximity to one another.

The vehicle A 502 may include a plurality of sensors 508 that may transmit and/or receive wireless communications via a wireless in-vehicle network (wIVN) 510. The wIVN may include a wIVN control unit 512 that controls aspects of the operation of the wIVN 510. As shown in FIG. 5, the vehicle B 504 also may include a plurality of sensors 514 and a wIVN control unit 516 that may transmit and/or receive wireless communications via a wIVN 518. The vehicle C 506 also may include a plurality of sensors 520 and a wIVN control unit 522 that may transmit and/or receive wireless communications via a wIVN 524.

In-vehicle communications (e.g., by sensors and/or other vehicle components) on one or more of the wIVNs 510, 518, or 524 may interfere with communications on one or more of the other wIVNs 510, 518, or 524. The interference between two or more of the wIVNs 510, 518, or 524 may be more disruptive when the associated vehicles are adjacent one another. This interference may inhibit the functioning of the wIVNs 510, 518, and/or 524 and/or sensors 508, 514, and/or 520.

Some aspects described herein enable a UE to transmit a wIVN capability indication that indicates that the UE is associated with a vehicle that includes a wIVN, thereby alerting another UE associated with another vehicle that includes another wIVN of the presence of the wIVN. The indication and a subsequent response from the other UE may facilitate and thereby enable proactive mitigation steps to be taken by controllers of the respective wIVNs, which improves the operation of the respective wIVNs. In some aspects, a set of application layer information elements (IEs) may be used to describe a vehicle's wIVN capability, thereby enabling inter-vehicle negotiation for interference management.

As indicated above, FIG. 5 is provided as an example. Other examples may differ from what is described with respect to FIG. 5.

Figure 6:
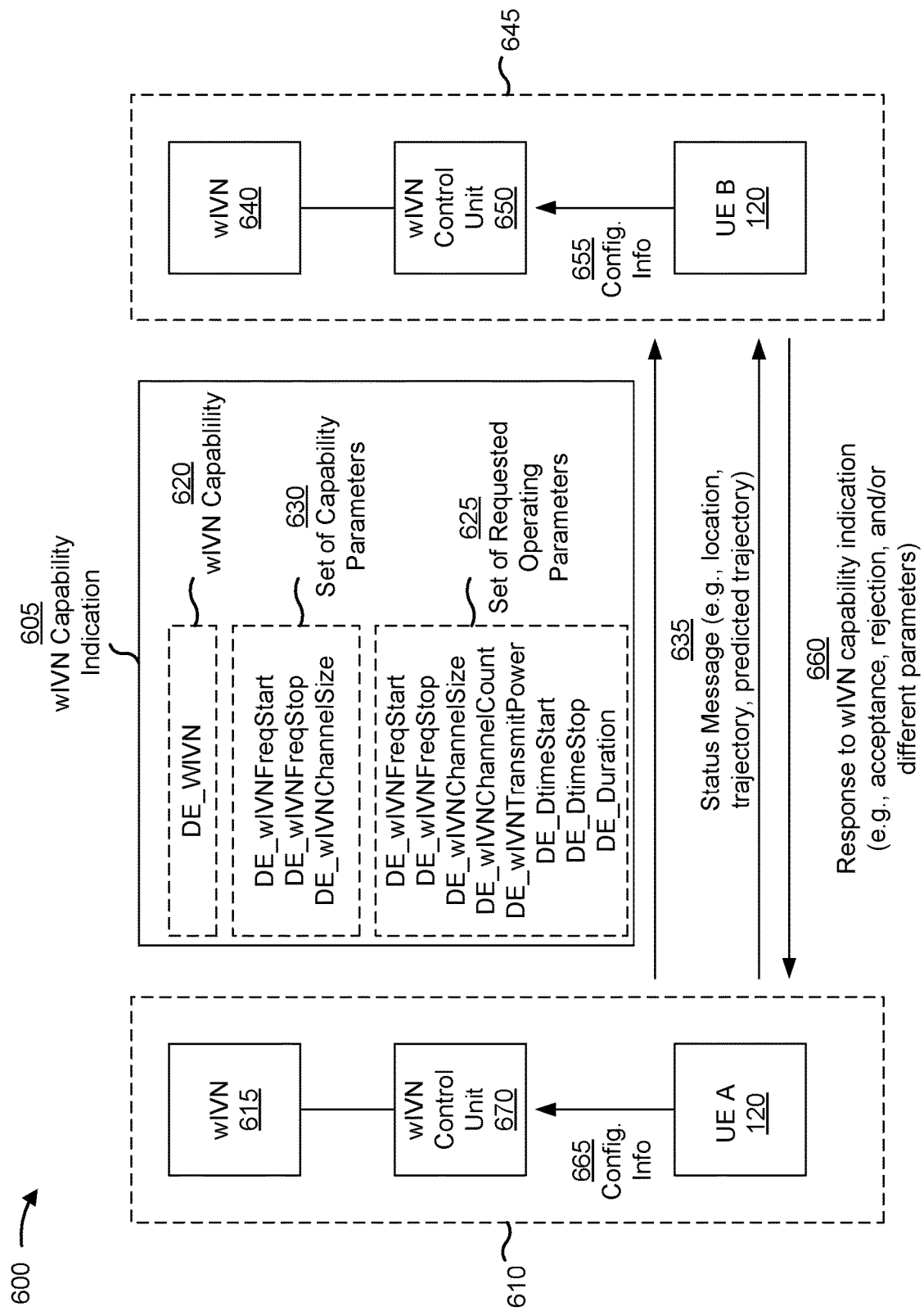
FIG. 6 is a diagram illustrating an example of inter-vehicle wireless in-vehicle network interference management, in accordance with the present disclosure.

FIG. 6 is a diagram illustrating an example 600 of inter-vehicle wireless in-vehicle network interference management, in accordance with the present disclosure.

As shown in FIG. 6, a UE A 120 and a UE B 120 may communicate with one another. The UE A 120 and the UE B 120 may communicate with one another using cellular communications, sidelink communications, and/or the like. For example, UE A 120 and the UE B 120 may communicate using one or more sidelink channels for D2D communications, which may include V2X communications (e.g., V2V communications, V2I communications, V2P communications, and/or the like), a dedicated short range communication (DSRC) network, and/or the like.

As shown by reference number 605, the UE A 120 may transmit, and the UE B 120 may receive, a wireless in-vehicle network (wIVN) capability indication that indicates that the UE A 120 is associated with a vehicle 610 that includes a wIVN 615. The UE A 120 may transmit the wIVN capability indication using an application layer message in a D2D communication. In some aspects, the UE A 120 may transmit the wIVN capability indication using an application layer message in a cellular vehicle-to-everything (C-V2X) network, a DSRC network, and/or the like.

The application layer message may be an existing type of application layer message (e.g., an application layer message already specified in a communication protocol standard). For example, the application layer message may include a basic safety message (BSM), a cooperative awareness message (CAM), and/or the like. In some aspects, the application layer message may include a new type of message (e.g., a message that is dedicated to the purpose of carrying a wIVN capability indication).

As shown in FIG. 6, the wIVN capability indication may include a capability parameter 620. The capability parameter 620 may be transmitted using an information element (IE) (shown as "DE_wIVN") that indicates whether the vehicle associated with the UE A 120 includes a wIVN. The term information element (IE) may be interchangeable, herein, with "data element" (DE). In some aspects, the capability parameter 620 may include a binary value set by a single bit. Additionally, or alternatively, the wIVN capability indication may include a preliminary set of wIVN parameters. The term "preliminary set of wIVN parameters" refers to a first set of wIVN parameters that is indicated during a negotiation between UEs. A preliminary set of wIVN parameters may include a current set of wIVN parameters (e.g., a set of wIVN parameters corresponding to a current operation of a UE), a requested set of wIVN parameters (e.g., a set of wIVN parameters that a UE requests to use for a future operation), a set of capabilities, or a combination thereof. The preliminary set of wIVN parameters may be transmitted in the capability indication using application layer IEs. In some aspects, the preliminary set of wIVN parameters may be transmitted in a message that is separate from the wIVN capability indication.

The preliminary set of wIVN parameters may include a set 625 of requested operating parameters for the wIVN 615. The set 625 of requested operating parameters may indicate a requested usage for the wIVN 615. In some aspects, the set 625 of requested operating parameters may correspond, at least in part, to a current operation of the wIVN 615. For example, if the wIVN 615 is operating according to a set of parameters at a time when the UE A 120 transmits the wIVN capability indication, the set 625 of requested operating parameters may indicate a request to continue operating according to at least one of the same parameters. In some aspects, the set 625 of requested operating parameters may correspond, at least in part, to a future operation of the wIVN 615. For example, the set 625 of requested operating parameters may indicate a request to operate according to at least one new parameter or parameters.

The set 625 of requested operating parameters may include frequency domain IEs, time domain IEs, signal characteristic IEs, and/or the like. In some aspects, the set 625 of requested operating parameters may include a requested channel start frequency for the wIVN 615 (shown as "DE_wIVNFreqStart"), a requested channel stop frequency for the wIVN 615 (shown as "DE_wIVNFreqStop"), a requested number of channels to be used for the wIVN 615 (shown as "DE_wIVNChannelCount"), a requested channel size to be used for the wIVN 615 (shown as "DE_wIVN-ChannelSize"), and/or the like. The set 625 of requested operating parameters may include a requested transmit power for the wIVN 615 (shown as "DE_wIVNTransmit-Power"), a requested usage start time associated with the wIVN 615 (shown as "DE_DtimeStart"), a requested usage stop time associated with the wIVN 615 (shown as "DE_D-timeStop"), a requested usage duration associated with the wIVN 615 (shown as "DE_Duration"), and/or the like.

As shown in FIG. 6, the preliminary set of wIVN parameters may include a set 630 of capability parameters indicating at least one operating capability of the wIVN 615. The set 630 of capability parameters may include frequency domain IEs, time domain IEs, signal characteristic IEs, and/or the like. In some aspects, the set 630 of capability parameters may include an operating frequency range start frequency of the wIVN 615 (shown as "DE_wIVN-FreqStart"), an operating frequency range stop frequency of the wIVN 615 (shown as "DE_wIVNFreqStop"), an operating frequency range of the wIVN 615 (not shown, but implicitly defined by DE_wIVNFreqStart and DE_wIVN-FreqStop), an operating frequency channel width of the wIVN 615 (shown as "DE_wIVNChannelSize), and/or the like. In some aspects, IEs may be reused in different data fields, thereby reducing signaling overhead. For example, as shown, DE_wIVNFreqStart, DE_wIVNFreqStop, and DE_wIVNChannelSize may be used both for indicating capability parameters and requested operating parameters.

As shown by reference number 635, the UE A 120 may transmit, and the UE B 120 may receive, a status message. The status message may include a location indication that indicates a current location of the UE A 120. The status message may include a trajectory indication that indicates a current trajectory of the UE A 120, a predicted trajectory of the UE A 120, and/or the like. In some aspects, the status message may include a C-V2X status message (e.g., a BSM, a CAM, and/or the like).

In some aspects, the UE B 120 may determine, based at least in part on at least one of the wIVN capability indication, the location indication, the trajectory indication, or a combination thereof, whether operation of the wIVN 615 presents a potential conflict (e.g., due to interference) with operation of another wIVN 640, where the UE B 120 may be associated with another vehicle 645 that includes the other wIVN 640. For example, UE B 120 may determine whether operation of the wIVN 615 presents a potential conflict with operation of wIVN 640 by receiving an indication of a potential conflict (or of no potential conflict) from a wIVN control unit 650 corresponding to the wIVN 640.

In some aspects, the UE B 120 may determine that operation of the wIVN 615 does not present a potential conflict with operation of the wIVN 640 due to at least one of the location indication and/or the trajectory indication. For example, the UE B 120 may determine, based at least in part on the location indication, that the UE A 120 (and, thus, the vehicle 610) is not close enough to the vehicle 645 for the wIVN 615 to cause interference with the wIVN 640. The UE B 120 may also determine that the trajectory and/or the predicted trajectory of the UE A 120 will not result in the UE A 120 being close enough to cause the interference.

In some aspects, the UE B 120 may determine that operation of the wIVN 615 does present a potential conflict with operation of the wIVN 640 due to the wIVN capability indication, the location indication, the trajectory indication, and/or the like. As shown by reference number 655, the UE B 120 may provide configuration information to the wIVN control unit 650 associated with configuring the wIVN 640 based at least in part on the wIVN capability indication, the location indication, the trajectory indication, and/or the like. The UE B 120 may provide the configuration information to the wIVN control unit 650 in response to a successful negotiation, to obtain a proposed set of parameters to transmit to the UE A 120, and/or the like.

As indicated above, the UE A 120 and UE B 120 may negotiate to establish mutually-compatible parameters by which the respective wIVNs 615 and 640 may operate. As shown by reference number 660, the UE B 120 may transmit, and the UE A 120 may receive, a response to the wIVN capability indication. In some aspects, the UE B 120 may transmit the response using an application layer message in a D2D communication, over a C-V2X network, a DSRC network, and/or the like. The application layer message may be an existing type of application layer message (e.g., a BSM, a CAM, and/or the like), a new type of application layer message, and/or the like.

In some aspects, the response may indicate acceptance of the preliminary set of parameters, rejection of the preliminary set of wIVN parameters, a different set of wIVN parameters, and/or the like. For example, the response may include a wIVN parameter acceptance message from the UE B 120 that indicates acceptance of a set of wIVN parameters (e.g., a set of requested operating parameters for the wIVN 615). In some aspects, the response may include a wIVN parameter rejection message that indicates rejection of a proposed set of wIVN parameters (e.g., a preliminary set of wIVN parameters including a set of requested operating parameters for the wIVN 615). In some aspects, the response may include a proposed set of wIVN parameters.

As shown by reference number 665, the UE A 120 may provide configuration information to a wIVN control unit 670 of the vehicle 610 associated with configuring the wIVN 615 based at least in part on the response. The UE A 120 may provide the configuration information to the wIVN control unit 670 in response to a successful negotiation (e.g., in response to receiving a wIVN parameter acceptance message from UE B 120 that indicates acceptance of a set of parameters), to obtain a proposed set of parameters to transmit to the UE B 120, and/or the like.

Some aspects of the inter-vehicle wIVN network interference management techniques described above may enable a UE to transmit wIVN capability information that indicates a vehicle's wIVN capability, specific operation parameters, requested operating parameters, and/or the like. In this way, aspects of the techniques described herein may facilitate inter-vehicle negotiation for interference management by allowing UEs to exchange information to determine mutually compatible wIVN parameters. In some aspects, the IEs discussed above for indicating parameters may be transmitted in existing application layer messages, thereby enabling interference management without increasing signaling overhead.

As indicated above, FIG. 6 is provided as an example. Other examples may differ from what is described with respect to FIG. 6.

Figure 7:
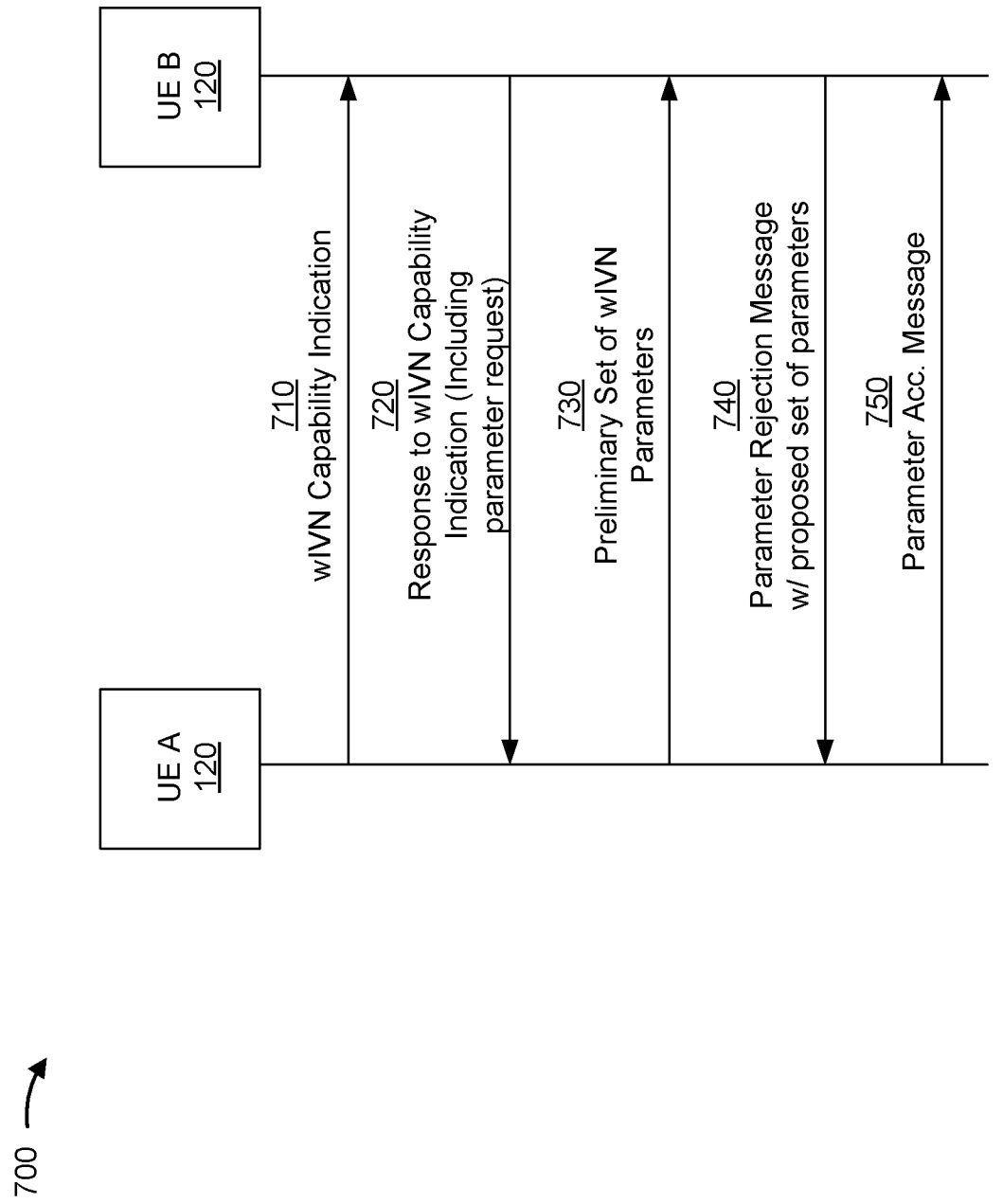
FIG. 7 is a diagram illustrating an example of inter-vehicle wireless in-vehicle network interference management, in accordance with the present disclosure.

FIG. 7 is a diagram illustrating an example 700 of inter-vehicle wireless in-vehicle network interference management, in accordance with the present disclosure.

As shown in FIG. 7, a UE A 120 and a UE B 120 may communicate with one another. The UE A 120 and the UE B 120 may communicate with one another using cellular communications, sidelink communications, and/or the like. For example, UE A 120 and the UE B 120 may communicate using one or more sidelink channels for D2D communications, which may include V2X communications (e.g., V2V communications, V2I communications, V2P communications, and/or the like).

As shown by reference number 710, the UE A 120 may transmit, and the UE B 120 may receive, a wIVN capability indication that indicates that the UE A 120 is associated with a vehicle that includes a wIVN. The UE A 120 may transmit the wIVN capability indication using an application layer message in a D2D communication over a C-V2X network, a DSRC network, and/or the like. The application layer message may be an existing type of application layer message (e.g., a BSM, a CAM, and/or the like), a new type of message, and/or the like.

As shown by reference number 720, the UE B 120 may transmit, and the UE A 120 may receive, a response to the wIVN capability indication. The response may include a request for preliminary parameters. As shown by reference number 730, the UE A 120 may transmit, and the UE B 120 may receive, a preliminary set of wIVN parameters. The UE A 120 may transmit the preliminary set of wIVN parameters in response to receiving the request for preliminary parameters. The preliminary set of wIVN parameters may include at least one of a set of requested operating parameters for the wIVN, a set of capability parameters indicating at least one operating capability of the wIVN, or a combination thereof.

As shown by reference number 740, the UE B 120 may transmit, and the UE A 120 may receive, a parameter rejection message. The parameter rejection message may include a proposed set of wIVN parameters for compatible operation by the wIVN. As shown by reference number 750, the UE A 120 may transmit, and the UE B 120 may receive, a wIVN parameter acceptance message to indicate acceptance of the proposed set of parameters. In some aspects, the UE A 120 and UE B 120 may exchange any number of messages, proposed sets of wIVN parameters, and/or the like, to facilitate negotiation of compatible wIVN parameters.

Some aspects of the inter-vehicle wIVN network interference management signaling described above may facilitate inter-vehicle negotiation for interference management by allowing UEs to exchange information to determine mutually compatible wIVN parameters. In some aspects, the IEs discussed above for indicating parameters may be transmitted in existing application layer messages, thereby facilitating interference management without increasing signaling overhead.

As indicated above, FIG. 7 is provided as an example. Other examples may differ from what is described with respect to FIG. 7.

Figure 8:
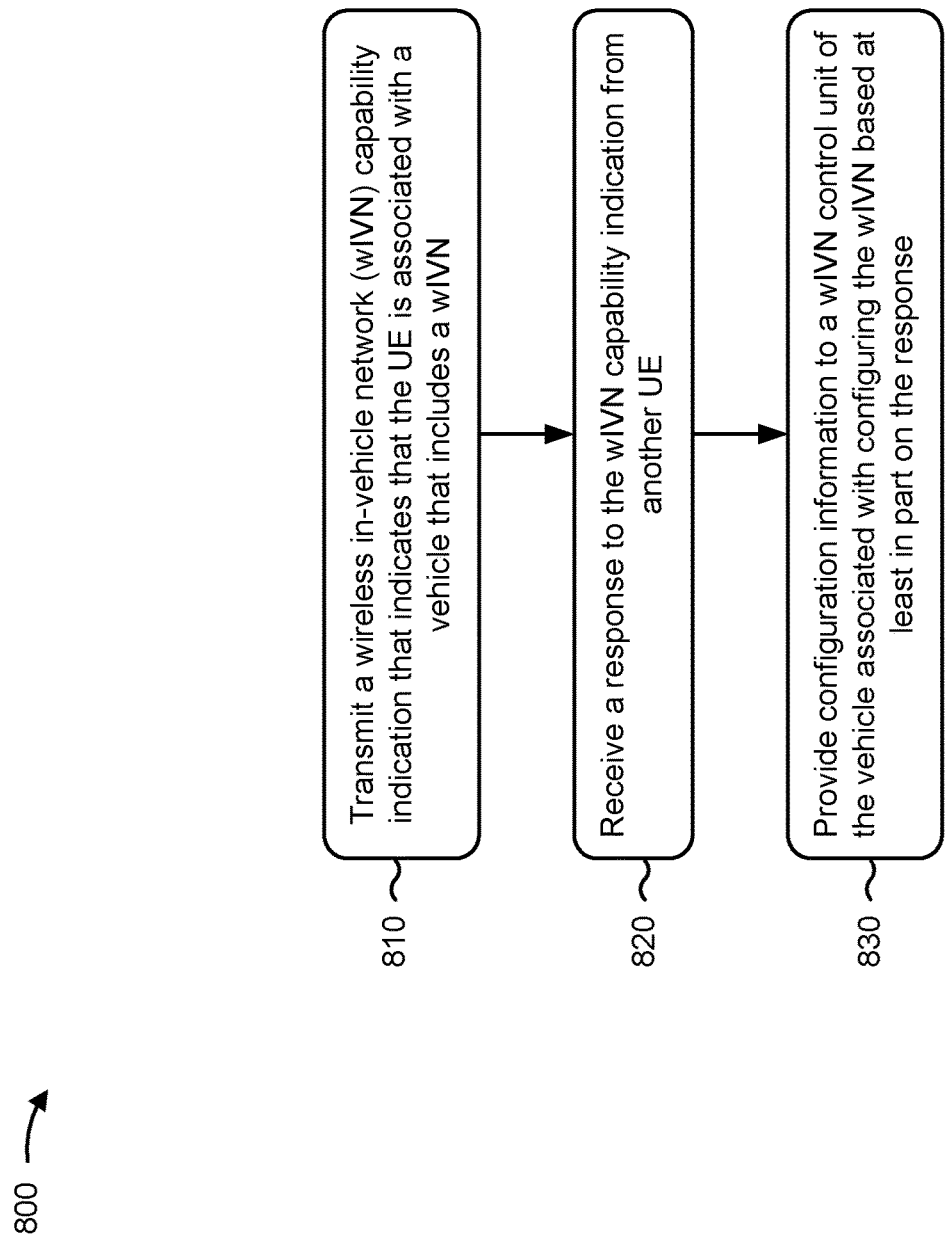
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with inter-vehicle wireless in-vehicle network interference management.

As shown in FIG. 8, in some aspects, process 800 may include transmitting a wIVN capability indication that indicates that the UE is associated with a vehicle that includes a wIVN (block 810). For example, the UE (e.g., using transmit processor 264, controller/processor 280, memory 282, and/or the like) may transmit a wIVN capability indication that indicates that the UE is associated with a vehicle that includes a wIVN, as described above.

As further shown in FIG. 8, in some aspects, process 800 may include receiving a response to the wIVN capability indication from another UE (block 820). For example, the UE (e.g., using receive processor 258, controller/processor 280, memory 282, and/or the like) may receive a response to the wIVN capability indication from another UE, as described above.

As further shown in FIG. 8, in some aspects, process 800 may include providing configuration information to a wIVN control unit of the vehicle associated with configuring the wIVN based at least in part on the response (block 830). For example, the UE (e.g., using controller/processor 280, memory 282, and/or the like) may provide configuration information to a wIVN control unit of the vehicle associated with configuring the wIVN based at least in part on the response, as described above.

Process 800 may include additional aspects, such as any single aspect or any combination of aspects described below and/or in connection with one or more other processes described elsewhere herein.

In a first aspect, the wIVN capability indication is transmitted using an application layer message in a device-to-device (D2D) communication.

In a second aspect, alone or in combination with the first aspect, the wIVN capability indication is transmitted using an application layer message in a cellular vehicle-to-everything (C-V2X) network.

In a third aspect, alone or in combination with one or more of the first and second aspects, the wIVN capability indication is transmitted in at least one of a basic safety message (BSM), a cooperative awareness message (CAM), or a combination thereof.

In a fourth aspect, alone or in combination with one or more of the first through third aspects, the wIVN capability indication includes a set of parameters that indicate a requested usage for the wIVN.

In a fifth aspect, alone or in combination with one or more of the first through fourth aspects, the response indicates acceptance of the set of parameters, rejection of the set of parameters, a different set of parameters, or a combination thereof.

In a sixth aspect, alone or in combination with one or more of the first through fifth aspects, the wIVN capability indication includes a set of parameters that indicate at least one of: an operating frequency range of the wIVN, an operating frequency range start frequency of the wIVN, an operating frequency range stop frequency of the wIVN, an operating frequency channel width of the wIVN, a requested channel start frequency for the wIVN, a requested channel stop frequency for the wIVN, a requested number of channels to be used for the wIVN, a requested channel size to be used for the wIVN, a requested transmit power for the wIVN, a requested usage start time associated with the wIVN, a requested usage stop time associated with the wIVN, a requested usage duration associated with the wIVN, or a combination thereof.

In a seventh aspect, alone or in combination with one or more of the first through sixth aspects, process 800 includes receiving, from the other UE, a proposed set of parameters for the wIVN; determining that the proposed set of parameters is supported by the wIVN; transmitting a wIVN parameter acceptance message to the other UE to indicate acceptance of the proposed set of parameters; and providing an indication of the proposed set of wIVN parameters to the wIVN control unit.

In an eighth aspect, alone or in combination with one or more of the first through seventh aspects, process 800 includes transmitting, to the other UE, a preliminary set of wIVN parameters, and the preliminary set of wIVN parameters comprises at least one of: a set of requested operating parameters for the wIVN, a set of capability parameters indicating at least one operating capability of the wIVN, or a combination thereof.

In a ninth aspect, alone or in combination with one or more of the first through eighth aspects, the wIVN capability indication includes the preliminary set of wIVN parameters.

In a tenth aspect, alone or in combination with one or more of the first through ninth aspects, the preliminary set of wIVN parameters is transmitted to the other UE based at least in part on the response, and the response includes a request for preliminary parameters.

In an eleventh aspect, alone or in combination with one or more of the first through tenth aspects, the set of requested operating parameters corresponds to a current operation of the wIVN.

In a twelfth aspect, alone or in combination with one or more of the first through eleventh aspects, process 800 includes receiving, in the response, an initial proposed set of wIVN parameters for compatible operation by the wIVN; determining that the initial proposed set of wIVN parameters is not supported by the wIVN; and transmitting a wIVN parameter rejection message to the other UE to indicate rejection of the initial proposed set of wIVN parameters.

In a thirteenth aspect, alone or in combination with one or more of the first through twelfth aspects, the wIVN parameter rejection message comprises an alternative proposed set of wIVN parameters.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
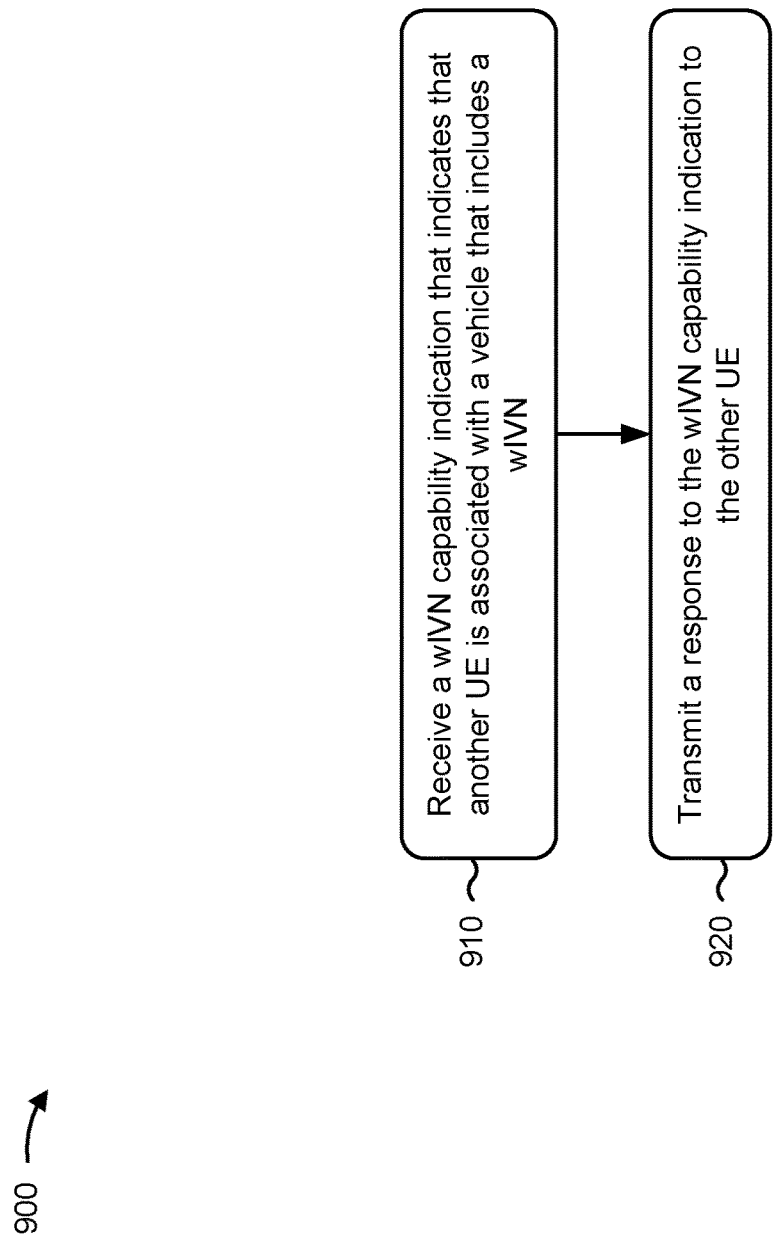
FIG. 9 is a diagram illustrating an example process performed, for example, by a user equipment, in accordance with the present disclosure.

FIG. 9 is a diagram illustrating an example process 900 performed, for example, by a UE, in accordance with the present disclosure. Example process 900 is an example where the UE (e.g., UE 120 and/or the like) performs operations associated with inter-vehicle wireless in-vehicle network interference management.

As shown in FIG. 9, in some aspects, process 900 may include receiving a wIVN capability indication that indicates that another UE is associated with a vehicle that includes a wIVN (block 910). For example, the UE (e.g., using receive processor 258, controller/processor 280, memory 282, and/or the like) may receive a wIVN capability indication that indicates that another UE is associated with a vehicle that includes a wIVN, as described above.

As further shown in FIG. 9, in some aspects, process 900 may include transmitting a response to the wIVN capability indication to the other UE (block 920). For example, the UE (e.g., using transmit processor 264, controller/processor 280, memory 282, and/or the like) may transmit a response to the wIVN capability indication to the other UE, as described above.

Process 900 may include additional aspects, such as any single aspect or any combination of aspects described below and/or in connection with one or more other processes described elsewhere herein.

In a first aspect, the wIVN capability indication includes a set of parameters that indicate a requested usage for the wIVN.

In a second aspect, alone or in combination with the first aspect, the response indicates acceptance of the set of parameters, rejection of the set of parameters, a different set of parameters, or a combination thereof.

In a third aspect, alone or in combination with one or more of the first and second aspects, the wIVN capability indication includes a set of parameters that indicate at least one of: an operating frequency range of the wIVN, an operating frequency range start frequency of the wIVN, an operating frequency range stop frequency of the wIVN, an operating frequency channel width of the wIVN, a requested channel start frequency for the wIVN, a requested channel stop frequency for the wIVN, a requested number of channels to be used for the wIVN, a requested channel size to be used for the wIVN, a requested transmit power for the wIVN, a requested usage start time associated with the wIVN, a requested usage stop time associated with the wIVN, a requested usage duration associated with the wIVN, or a combination thereof.

In a fourth aspect, alone or in combination with one or more of the first through third aspects, process 900 includes transmitting, to the other UE, a proposed set of parameters for the wIVN, wherein the UE is being associated with another vehicle that includes another wIVN; receiving a wIVN parameter acceptance message from the other UE that indicates acceptance of the proposed set of parameters; and providing configuration information to a wIVN control unit of the other vehicle associated with configuring the other wIVN based at least in part on the wIVN parameter acceptance message.

In a fifth aspect, alone or in combination with one or more of the first through fourth aspects, the process 900 includes receiving, from the other UE, a preliminary set of wIVN parameters, the preliminary set of wIVN parameters comprises at least one of: a set of requested operating parameters for the wIVN, a set of capability parameters indicating at least one operating capability of the wIVN, or a combination thereof.

In a sixth aspect, alone or in combination with one or more of the first through fifth aspects, the wIVN capability indication includes the preliminary set of wIVN parameters.

In a seventh aspect, alone or in combination with one or more of the first through sixth aspects, the response to the wIVN capability indication includes a request for preliminary parameters, and the preliminary set of wIVN parameters is transmitted to the UE based at least in part on the response.

In an eighth aspect, alone or in combination with one or more of the first through seventh aspects, the set of requested operating parameters corresponds to a current operation of the wIVN.

In a ninth aspect, alone or in combination with one or more of the first through eighth aspects, process 900 includes transmitting, in the response, an initial proposed set of wIVN parameters for compatible operation by the wIVN; and receiving a wIVN parameter rejection message from the other UE that indicates rejection of the initial proposed set of wIVN parameters by the other UE.

In a tenth aspect, alone or in combination with one or more of the first through ninth aspects, the wIVN parameter rejection message comprises an alternative proposed set of wIVN parameters.

In an eleventh aspect, alone or in combination with one or more of the first through tenth aspects, process 900 includes receiving, from the other UE, a location indication that indicates a current location of the other UE and a trajectory indication that indicates at least one of a current trajectory of the other UE, a predicted trajectory of the UE, or a combination thereof; determining, based at least in part on at least one of the wIVN capability indication, the location indication, the trajectory indication, or a combination thereof, that operation of the wIVN presents a potential conflict with operation of another wIVN, wherein the UE is being associated with another vehicle that includes the other wIVN; and providing configuration information to a wIVN control unit of the other vehicle associated with configuring the other wIVN based at least in part on at least one of the wIVN capability indication, the location indication, the trajectory indication, or a combination thereof.

In a twelfth aspect, alone or in combination with one or more of the first through eleventh aspects, the wIVN capability indication is transmitted using an application layer message in a D2D communication.

In a thirteenth aspect, alone or in combination with one or more of the first through twelfth aspects, the wIVN capability indication is transmitted using an application layer message on a cellular V2X network.

In a fourteenth aspect, alone or in combination with one or more of the first through thirteenth aspects, the wIVN capability indication is transmitted in at least one of a BSM, a CAM, or a combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some aspects of the present disclosure:

Aspect 1: A method of wireless communication performed by a user equipment (UE), comprising: transmitting a wireless in-vehicle network (wIVN) capability indication that indicates that the UE is associated with a vehicle that includes a wIVN; receiving a response to the wIVN capability indication from another UE; and providing configuration information to a wIVN control unit of the vehicle associated with configuring the wIVN based at least in part on the response.

Aspect 2: The method of aspect 1, wherein the wIVN capability indication is transmitted using an application layer message in a device-to-device (D2D) communication.

Aspect 3: The method of aspect 2, wherein the wIVN capability indication is transmitted using an application layer message in a cellular vehicle-to-everything (C-V2X) network.

Aspect 4: The method of any of aspects 1-3, wherein the wIVN capability indication is transmitted in at least one of a basic safety message (BSM), a cooperative awareness message (CAM), or a combination thereof.

Aspect 5: The method of any of aspects 1-4, wherein the wIVN capability indication includes a set of parameters that indicate a requested usage for the wIVN.

Aspect 6: The method of aspect 5, wherein the response indicates acceptance of the set of parameters, rejection of the set of parameters, a different set of parameters, or a combination thereof.

Aspect 7: The method of any of aspects 1-6, wherein the wIVN capability indication includes a set of parameters that indicate at least one of: an operating frequency range of the wIVN, an operating frequency range start frequency of the wIVN, an operating frequency range stop frequency of the wIVN, an operating frequency channel width of the wIVN, a requested channel start frequency for the wIVN, a requested channel stop frequency for the wIVN, a requested number of channels to be used for the wIVN, a requested channel size to be used for the wIVN, a requested transmit power for the wIVN, a requested usage start time associated with the wIVN, a requested usage stop time associated with the wIVN, a requested usage duration associated with the wIVN, or a combination thereof.

Aspect 8: The method of any of aspects 1-7, further comprising: receiving, from the other UE, a proposed set of parameters for the wIVN; determining that the proposed set of parameters is supported by the wIVN; transmitting a wIVN parameter acceptance message to the other UE to indicate acceptance of the proposed set of parameters; and providing an indication of the proposed set of wIVN parameters to the wIVN control unit.

Aspect 9: The method of any of aspects 1-8, further comprising transmitting, to the other UE, a preliminary set of wIVN parameters, wherein the preliminary set of wIVN parameters comprises at least one of: a set of requested operating parameters for the wIVN, a set of capability parameters indicating at least one operating capability of the wIVN, or a combination thereof.

Aspect 10: The method of aspect 9, wherein the wIVN capability indication includes the preliminary set of wIVN parameters.

Aspect 11: The method of either of aspects 9 or 10, wherein the preliminary set of wIVN parameters is transmitted to the other UE based at least in part on the response, wherein the response includes a request for preliminary parameters.

Aspect 12: The method of any of aspects 1-11, further comprising: receiving, in the response, an initial proposed set of wIVN parameters for compatible operation by the wIVN; determining that the initial proposed set of wIVN parameters is not supported by the wIVN; and transmitting a wIVN parameter rejection message to the other UE to indicate rejection of the initial proposed set of wIVN parameters.

Aspect 13: The method of aspect 12, wherein the wIVN parameter rejection message comprises an alternative proposed set of wIVN parameters.

Aspect 14: A method of wireless communication performed by a user equipment (UE), comprising: receiving a wireless in-vehicle network (wIVN) capability indication that indicates that another UE is associated with a vehicle that includes a wIVN; and transmitting a response to the wIVN capability indication to the other UE.

Aspect 15: The method of aspect 14, wherein the wIVN capability indication includes a set of parameters that indicate a requested usage for the wIVN.

Aspect 16: The method of aspect 15, wherein the response indicates acceptance of the set of parameters, rejection of the set of parameters, a different set of parameters, or a combination thereof.

Aspect 17: The method of any of aspects 14-16, wherein the wIVN capability indication includes a set of parameters that indicate at least one of: an operating frequency range of the wIVN, an operating frequency range start frequency of the wIVN, an operating frequency range stop frequency of the wIVN, an operating frequency channel width of the wIVN, a requested channel start frequency for the wIVN, a requested channel stop frequency for the wIVN, a requested number of channels to be used for the wIVN, a requested channel size to be used for the wIVN, a requested transmit power for the wIVN, a requested usage start time associated with the wIVN, a requested usage stop time associated with the wIVN, a requested usage duration associated with the wIVN, or a combination thereof.

Aspect 18: The method of any of aspects 14-17, further comprising: transmitting, to the other UE, a proposed set of parameters for the wIVN, wherein the UE is associated with another vehicle that includes another wIVN; receiving a wIVN parameter acceptance message from the other UE that indicates acceptance of the proposed set of parameters; and providing configuration information to a wIVN control unit of the other vehicle associated with configuring the other wIVN based at least in part on the wIVN parameter acceptance message.

Aspect 19: The method of any of aspects 14-18, further comprising receiving, from the other UE, a preliminary set of wIVN parameters, wherein the preliminary set of wIVN parameters comprises at least one of: a set of requested operating parameters for the wIVN, a set of capability parameters indicating at least one operating capability of the wIVN, or a combination thereof.

Aspect 20: The method of aspect 19, wherein the wIVN capability indication includes the preliminary set of wIVN parameters.

Aspect 21: The method of either of aspects 19 or 20, wherein the response to the wIVN capability indication includes a request for preliminary parameters, and wherein the preliminary set of wIVN parameters is transmitted to the UE based at least in part on the response.

Aspect 22: The method of any of aspects 14-21, further comprising: transmitting, in the response, an initial proposed set of wIVN parameters for compatible operation by the wIVN; and receiving a wIVN parameter rejection message from the other UE that indicates rejection of the initial proposed set of wIVN parameters by the other UE.

Aspect 23: The method of aspect 22, wherein the wIVN parameter rejection message comprises an alternative proposed set of wIVN parameters.

Aspect 24: The method of any of aspects 14-23, further comprising: receiving, from the other UE, a location indication that indicates a current location of the other UE and a trajectory indication that indicates at least one of a current trajectory of the other UE, a predicted trajectory of the UE, or a combination thereof, determining, based at least in part on at least one of the wIVN capability indication, the location indication, the trajectory indication, or a combination thereof, that operation of the wIVN presents a potential conflict with operation of another wIVN, wherein the UE is associated with another vehicle that includes the other wIVN; and providing configuration information to a wIVN control unit of the other vehicle associated with configuring the other wIVN based at least in part on at least one of the wIVN capability indication, the location indication, the trajectory indication, or a combination thereof.

Aspect 25: The method of any of aspects 14-24, wherein the wIVN capability indication is transmitted using an application layer message in a device-to-device (D2D) communication.

Aspect 26: The method of any of aspects 14-25, wherein the wIVN capability indication is transmitted using an application layer message on a cellular vehicle-to-everything (V2X) network.

Aspect 27: The method of aspect 14, wherein the wIVN capability indication is transmitted in at least one of a basic safety message (BSM), a cooperative awareness message (CAM), or a combination thereof.

Aspect 28: An apparatus for wireless communication at a device, comprising a processor; memory coupled with the processor; and instructions stored in the memory and executable by the processor to cause the apparatus to perform the method of one or more aspects of aspects 1-13.

Aspect 29: A device for wireless communication, comprising a memory and one or more processors coupled to the memory, the memory and the one or more processors configured to perform the method of one or more aspects of aspects 1-13.

Aspect 30: An apparatus for wireless communication, comprising at least one means for performing the method of one or more aspects of aspects 1-13.

Aspect 31: A non-transitory computer-readable medium storing code for wireless communication, the code comprising instructions executable by a processor to perform the method of one or more aspects of aspects 1-13.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-13.

Aspect 33: An apparatus for wireless communication at a device, comprising a processor; memory coupled with the processor; and instructions stored in the memory and executable by the processor to cause the apparatus to perform the method of one or more aspects of aspects 14-27.

Aspect 34: A device for wireless communication, comprising a memory and one or more processors coupled to the memory, the memory and the one or more processors configured to perform the method of one or more aspects of aspects 14-27.

Aspect 35: An apparatus for wireless communication, comprising at least one means for performing the method of one or more aspects of aspects 14-27.

Aspect 36: A non-transitory computer-readable medium storing code for wireless communication, the code comprising instructions executable by a processor to perform the method of one or more aspects of aspects 14-27.

Aspect 37: A non-transitory computer-readable medium storing a set of instructions for wireless communication, the set of instructions comprising one or more instructions that, when executed by one or more processors of a device, cause the device to perform the method of one or more aspects of aspects 14-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
        transmit, using an application layer message, a wireless in-vehicle network (wIVN) capability indication that indicates that the UE is associated with a vehicle that includes a wIVN;
        receive a response to the wIVN capability indication from another UE including a proposed set of parameters for the wIVN;
        determine whether the proposed set of parameters is supported by the wIVN; and
        provide an indication of the proposed set of wIVN parameters to a wIVN control unit of the vehicle associated with configuring the wIVN based at least in part on determining that the proposed set of parameters is supported by the wIVN.

2. The UE of claim 1, wherein the wIVN capability indication is transmitted using the application layer message in a device-to-device (D2D) communication.

3. The UE of claim 2, wherein the wIVN capability indication is transmitted using the application layer message in a cellular vehicle-to-everything (C-V2X) network.

4. The UE of claim 1, wherein the wIVN capability indication is transmitted in at least one of a basic safety message (BSM), a cooperative awareness message (CAM), or a combination thereof.

5. The UE of claim 1, wherein the wIVN capability indication includes a set of parameters that indicate a requested usage for the wIVN.

6. The UE of claim 5, wherein the response indicates acceptance of the set of parameters, rejection of the set of parameters, a different set of parameters, or a combination thereof.

7. The UE of claim 1, wherein the wIVN capability indication includes a set of parameters that indicate at least one of:
    an operating frequency range of the wIVN,
    an operating frequency range start frequency of the wIVN,
    an operating frequency range stop frequency of the wIVN,
    an operating frequency channel width of the wIVN,
    a requested channel start frequency for the wIVN,
    a requested channel stop frequency for the wIVN,
    a requested number of channels to be used for the wIVN,
    a requested channel size to be used for the wIVN,
    a requested transmit power for the wIVN,
    a requested usage start time associated with the wIVN,
    a requested usage stop time associated with the wIVN,
    a requested usage duration associated with the wIVN, or
    a combination thereof.

8. The UE of claim 1, wherein the one or more processors are further configured to:

transmit a wIVN parameter acceptance message to the other UE to indicate acceptance of the proposed set of parameters.

9. The UE of claim 1, wherein the one or more processors are further configured to transmit, to the other UE, a preliminary set of wIVN parameters, wherein the preliminary set of wIVN parameters comprises at least one of:
a set of requested operating parameters for the wIVN,
a set of capability parameters indicating at least one operating capability of the wIVN, or
a combination thereof.

10. The UE of claim 9, wherein the wIVN capability indication includes the preliminary set of wIVN parameters.

11. The UE of claim 9 wherein the preliminary set of wIVN parameters is transmitted to the other UE based at least in part on the response, wherein the response includes a request for preliminary parameters.

12. The UE of claim 1, wherein the one or more processors are further configured to:
receive an initial proposed set of wIVN parameters for compatible operation by the wIVN;
determine that the initial proposed set of wIVN parameters is not supported by the wIVN; and
transmit a wIVN parameter rejection message to the other UE to indicate rejection of the initial proposed set of wIVN parameters.

13. The UE of claim 12, wherein the wIVN parameter rejection message comprises an alternative proposed set of wIVN parameters.

14. A user equipment (UE) for wireless communication, comprising:
a memory; and
one or more processors coupled to the memory, the one or more processors configured to:
receive a wireless in-vehicle network (wIVN) capability indication that indicates that another UE is associated with a vehicle that includes a wIVN; and
transmit, using an application layer message, a response to the wIVN capability indication to the other UE to establish parameters associated with a configuration of the wIVN, wherein the response includes a proposed set of parameters.

15. The UE of claim 14, wherein the wIVN capability indication includes a set of parameters that indicate a requested usage for the wIVN.

16. The UE of claim 15, wherein the response indicates acceptance of the set of parameters, rejection of the set of parameters, a different set of parameters, or a combination thereof.

17. The UE of claim 14, wherein the wIVN capability indication includes a set of parameters that indicate at least one of:
an operating frequency range of the wIVN,
an operating frequency range start frequency of the wIVN,
an operating frequency range stop frequency of the wIVN,
an operating frequency channel width of the wIVN,
a requested channel start frequency for the wIVN,
a requested channel stop frequency for the wIVN,
a requested number of channels to be used for the wIVN,
a requested channel size to be used for the wIVN,
a requested transmit power for the wIVN,
a requested usage start time associated with the wIVN,
a requested usage stop time associated with the wIVN,
a requested usage duration associated with the wIVN, or
a combination thereof.

18. The UE of claim 14, wherein the UE is associated with another vehicle that includes another wIVN, and wherein the one or more processors are further configured to:
receive a wIVN parameter acceptance message from the other UE that indicates acceptance of the proposed set of parameters; and
provide configuration information to a wIVN control unit of the other vehicle associated with configuring the other wIVN based at least in part on the wIVN parameter acceptance message.

19. The UE of claim 14, wherein the one or more processors are further configured to receive, from the other UE, a preliminary set of wIVN parameters, wherein the preliminary set of wIVN parameters comprises at least one of:
a set of requested operating parameters for the wIVN,
a set of capability parameters indicating at least one operating capability of the wIVN, or
a combination thereof.

20. The UE of claim 19, wherein the wIVN capability indication includes the preliminary set of wIVN parameters.

21. The UE of claim 19, wherein the response to the wIVN capability indication includes a request for preliminary parameters, and wherein the preliminary set of wIVN parameters is transmitted to the UE based at least in part on the response.

22. The UE of claim 14, wherein the one or more processors are further configured to:
transmit an initial proposed set of wIVN parameters for compatible operation by the wIVN; and
receive a wIVN parameter rejection message from the other UE that indicates rejection of the initial proposed set of wIVN parameters by the other UE.

23. The UE of claim 22, wherein the wIVN parameter rejection message comprises an alternative proposed set of wIVN parameters.

24. The UE of claim 14, wherein the one or more processors are further configured to:
receive, from the other UE, a location indication that indicates a current location of the other UE and a trajectory indication that indicates at least one of a current trajectory of the other UE, a predicted trajectory of the UE, or a combination thereof;
determine, based at least in part on at least one of the wIVN capability indication, the location indication, the trajectory indication, or a combination thereof, that operation of the wIVN presents a potential conflict with operation of another wIVN, wherein the UE is associated with another vehicle that includes the other wIVN; and
provide configuration information to a wIVN control unit of the other vehicle associated with configuring the other wIVN based at least in part on at least one of the wIVN capability indication, the location indication, the trajectory indication, or a combination thereof.

25. The UE of claim 14, wherein the wIVN capability indication is received using an application layer message in a device-to-device (D2D) communication.

26. The UE of claim 14, wherein the wIVN capability indication is received using an application layer message over a cellular vehicle-to-everything (V2X) network.

27. The UE of claim 14, wherein the wIVN capability indication is received in at least one of a basic safety message (BSM), a cooperative awareness message (CAM), or a combination thereof.

28. A method of wireless communication performed by a user equipment (UE), comprising:

transmitting, using an application layer message, a wireless in-vehicle network (wIVN) capability indication that indicates that the UE is associated with a vehicle that includes a wIVN;

receiving a response to the wIVN capability indication from another UE including a proposed set of parameters for the wIVN;

determining whether the proposed set of parameters is supported by the wIVN; and providing an indication of the proposed set of wIVN parameters to a wIVN control unit of the vehicle associated with configuring the wIVN based at least in part on determining that the proposed set of parameters is supported by the wIVN.

29. The method of claim 28, wherein the wIVN capability indication includes a set of parameters that indicate a requested usage for the wIVN.

30. A method of wireless communication performed by a user equipment (UE), comprising:

receiving a wireless in-vehicle network (wIVN) capability indication that indicates that another UE is associated with a vehicle that includes a wIVN; and transmitting, using an application layer message, a response to the wIVN capability indication to the other UE to establish parameters associated with a configuration of the wIVN, wherein the response includes a proposed set of parameters.

* * * * *